US012722128B2

(12) United States Patent
Mittal et al.

(10) Patent No.: US 12,722,128 B2
(45) Date of Patent: Sep. 1, 2026

(54) AXISYMMETRIC CONFINED IMPINGING JET MIXER

(71) Applicant: The Johns Hopkins University, Baltimore, MD (US)

(72) Inventors: Rajat Mittal, Vienna, VA (US); Jung Hee Seo, Baltimore, MD (US); Hai-Quan Mao, Baltimore, MD (US); Yue Hao, Baltimore, MD (US); Yizong Hu, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 685 days.

(21) Appl. No.: 18/001,440

(22) PCT Filed: Jun. 10, 2021

(86) PCT No.: PCT/US2021/036732
§ 371 (c)(1),
(2) Date: Dec. 9, 2022

(87) PCT Pub. No.: WO2021/252715
PCT Pub. Date: Dec. 16, 2021

(65) Prior Publication Data

US 2023/0219044 A1 Jul. 13, 2023

Related U.S. Application Data

(60) Provisional application No. 63/037,301, filed on Jun. 10, 2020.

(51) Int. Cl.
*B01F 25/23* (2022.01)
*B01F 25/10* (2022.01)
*B01F 25/25* (2022.01)
*B01F 33/30* (2022.01)

(52) U.S. Cl.
CPC ............ *B01F 25/23* (2022.01); *B01F 25/101* (2022.01); *B01F 25/25* (2022.01); *B01F 33/304* (2022.01); *B01F 33/3045* (2022.01)

(58) Field of Classification Search
CPC ............................... B01F 25/23; B01F 25/231
USPC ............................................ 366/162.4, 162.5
See application file for complete search history.

(56) References Cited

U.S. PATENT DOCUMENTS 902,858 A * 11/1908 Cooke et al. ......... A01J 25/162 99/452
949,869 A * 2/1910 White .................. F16K 11/165 137/630.17
1,806,801 A * 5/1931 Higgins ................ C01B 21/091 426/260

(Continued)

OTHER PUBLICATIONS

International Search Report and Written Opinion for PCT/US2021/036732. Mailed Sep. 1, 2021. 9 pages.

*Primary Examiner* — David L Sorkin
(74) *Attorney, Agent, or Firm* — Casimir Jones, SC; Jeffrey W. Childers

(57) ABSTRACT

A process and a device for continuous micromixing of two fluids is disclosed. The process and the device can be used in particular when micromixing plays an important role, for example, in the yield and characteristics of the products. This is the case for crystallization, precipitation and combustion reactions and for micelle assembly or polyelectrolyte complexation processes.

4 Claims, 17 Drawing Sheets
(6 of 17 Drawing Sheet(s) Filed in Color)

(56) References Cited

U.S. PATENT DOCUMENTS

| | | | | |
|---|---|---|---|---|
| 2,137,338 | A * | 11/1938 | Gosmann | B01F 25/23<br>261/78.2 |
| 2,509,288 | A * | 5/1950 | Brochner | B01F 25/23<br>366/173.1 |
| 3,306,587 | A | 2/1967 | Schroedter | |
| 3,498,028 | A * | 3/1970 | Trouw | B01F 25/23<br>261/78.2 |
| 4,994,242 | A | 2/1991 | Rae et al. | |
| 5,366,287 | A * | 11/1994 | Verstallen | B01F 25/23<br>366/162.4 |
| 2003/0166965 | A1 | 9/2003 | Wolfert et al. | |
| 2006/0109738 | A1 | 5/2006 | Buchholz | |
| 2013/0221141 | A1* | 8/2013 | Zhang | B01F 25/23<br>241/39 |
| 2020/0156038 | A1* | 5/2020 | Walter | B01J 19/06 |

* cited by examiner (I)

(II)

4

| | AxIM | CIJ |
|---|---|---|
| Size (nm) | 51.5 ± 0.7 | 51.8 ± 0.2 |
| Polydispersity index (PDI) | 0.142 ± 0.009 | 0.172 ± 0.009 |

*Fig. 14D*

AXISYMMETRIC CONFINED IMPINGING JET MIXER

GOVERNMENT RIGHTS

This invention was made with government support under grant EB018358 awarded by the National Institutes of Health. The government has certain rights in the invention.

FIELD OF THE INVENTION

The present invention relates generally to mixing devices. More particularly the present invention relates to an axisymmetric confined impinging jet mixer.

BACKGROUND

The prospect of developing a gene therapy for the detection and treatment of disease remains high for several clinical applications, including cancer, immunodeficiency, and metabolic disorders. Polymeric nanoparticles are the most widely used non-viral carriers, owing to their properties of protecting the DNA from degradation and improving intracellular delivery and transfection efficiency of the gene of interest. Polyelectrolyte complexes (PECs) have been used for drug delivery due to their ability to entrap therapeutic agents. Linear polyethylenimine (lPEI) is often used for gene therapy applications because it exhibits high gene delivery efficiency both in vitro and in vivo.

Bulk mixing in the form of vortexing or pipetting are widely used in laboratory environments. Due to their poor micromixing characteristics, however, they often lead to high degrees of variability within a preparation batch or between batches as a result of uncontrollable aggregates. Microfluidic devices with different designs have been reported aiming at delivering better control over particle size and its distribution. Microfluidic devices, however, also can have limitations, such as the need to formulate complex materials for nanoparticle formulation, as well as a limited production capacity (<7.2 g per day) due to the small size of the microfluidic channels.

Flash nanoprecipitation (FNP) offers a continuous and scalable process that has been used for the production of block copolymer nanoparticles. In contrast to block copolymer nanoparticles, however, the assembly of polyelectrolyte complexes is driven by a "complexation reaction", which is far different from the assembly of amphiphilic copolymers in aqueous media by the FNP method.

To overcome the limitations of microfluidic devices and FNP devices for the production of PEC nanoparticles, flash nanocomplexation (FNC) methods have been developed that employ two or more impinging jets within a mixing chamber. For the assembly of PECs, these devices can include: (a) flowing a first stream comprising one or more water-soluble polycationic polymers into a confined chamber; (b) flowing a second stream comprising one or more water-soluble polyanionic polymers into the confined chamber; and (c) impinging the first stream and the second stream in the confined chamber thereby causing the one or more water-soluble polycationic polymers and the one or more water-soluble polyanionic polymers to undergo a polyelectrolyte complexation process that continuously generates PEC nanoparticles. These types of devices that employ two or more impinging jets in a confined mixing chamber are referred to in the prior art as confined-impinging jet (CIJ) mixers.

Mixing via flow turbulence is highly effective because turbulence rapidly generates flow structures at a much-reduced length scale, where mixing among different components introduced by different flows can occur at a time scale of tens of milliseconds. For chemically reactive systems, a mixing rate that matches or is faster than the reaction rate is important because, if the mixing speed is slow, reaction happens in a temporally and spatially non-uniform manner, resulting in heterogeneous products. In a flash nanoprecipitation (FNP) system, nanoparticles can assemble more uniformly when the average solvent mixing rate is faster than the average phase separation rate of the polymer. Similarly, in a flash nanocomplexation (FNC) system, more uniform nanoparticles can be assembled when the average mixing rate of the polyelectrolytes introduced by the two inlets matches the polyelectrolyte complexation (PEC) rate. Turbulence-induced mixing can be achieved by T connectors, Tesla mixers, herringbone mixers, coaxial jet mixers, confined impinging jet mixers (CIJMs), and multi-inlet vortex mixers (MIVM).

A CIJM consists of two or more impinging jets and a mixing chamber. FIG. 1 (prior art) illustrates an exemplary CIJM mixing device known in the art. Liquid chemical solutions are injected as jets into the confined chamber and the jets impinge inside the chamber. CIJMs are widely used in chemical processes that require fast and thorough mixing, and can be used for injecting reactants, as to opposed jet burners and precipitators. Rapid breakdown of the shear layer resulting from the impinged jets and transition to turbulence can induce a high degree of mixing of the chemical species even in small-scale mixers, where Reynolds numbers are relatively low (1000 or lower).

The uniformity of the product in terms of size and/or composition is of great importance for processes such as drug production, since non-uniform product size or composition can result in variation in drug efficacy. While current CIJM designs provide rapid and thorough mixing, this does not guarantee a high degree of product uniformity. The size and composition depend not only on the local mixing quality but also on the overall residence time of the constituents in the mixing chamber. A longer residence time can lead to continuous complexation and growth in particle size, and vice-versa. A PEC nanoparticle that resides longer in the mixing chamber will continue to undergo reaction or complexation and will continue to grow in size and/or change its composition. Thus, to achieve a uniform particle size and composition, it is important that the residence time of the constituents in the mixer be as uniform as possible.

The non-uniformity of the residence time of particles or reaction/complexation products is connected to the presence of distinct paths with different pathlengths that these particles/products traverse to reach the exit of the mixing chamber. Existing designs of CIJMs employ mixing chambers that are cylindrical in shape. For such mixers, there exist distinct multiple pathways with very different pathlengths (see FIG. 2) for the products of reaction/precipitation/complexation to reach the exit of the CIJM. These different pathlengths combine with varying flow velocities to generate different residence time of the products and result in non-uniform product size and compositions.

Eliminating or reducing the number of pathways with disparate pathlengths in a confined-impinging jet mixer so that the uniformity of the residence time of the products is maintained is desirable.

SUMMARY

In some aspects, the presently disclosed subject matter provides a device for mixing that includes an axisymmetric mixing chamber having an axis of symmetry. The presently disclosed device also includes a pair of fluid transmission conduits. The fluid transmission conduits include a pair of inlet tubes. The inlet tubes are aligned along the axis of symmetry, wherein the pair of inlet tubes facilitate flow of two fluids to be mixed. The fluid transmission conduits also include outlet tubes to facilitate flow of a resultant fluid mixture out of the axisymmetric mixing chamber.

In some aspects, the outlet tubes are aligned along the axis of symmetry. The outlet tubes are arranged in an annular arrangement to the pair of inlet tubes. The axisymmetric mixing chamber further includes an axisymmetric slit. The axisymmetric mixing chamber also can also include a spherical shaped wall. The spherical shaped wall has a collection passage to collect the resultant fluid mixture to deliver the resultant fluid mixture to the outlet tubes. The axisymmetric mixing chamber further includes a cylindrical wall. The cylindrical shaped wall has a collection passage to collect the resultant fluid mixture to deliver the resultant fluid mixture to the outlet tubes. Additionally, the device can include axisymmetric internal baffles positioned within the axisymmetric mixing chamber. An axisymmetric chamber extension allows for a longer residence time for the reaction/complexation process to occur.

Certain aspects of the presently disclosed subject matter having been stated hereinabove, which are addressed in whole or in part by the presently disclosed subject matter, other aspects will become evident as the description proceeds when taken in connection with the accompanying Examples as best described herein below.

BRIEF DESCRIPTION OF THE DRAWINGS

The patent or application file contains at least one drawing executed in color. Copies of this patent or patent application publication with color drawings will be provided by the Office upon request and payment of the necessary fee.

Figure 1:
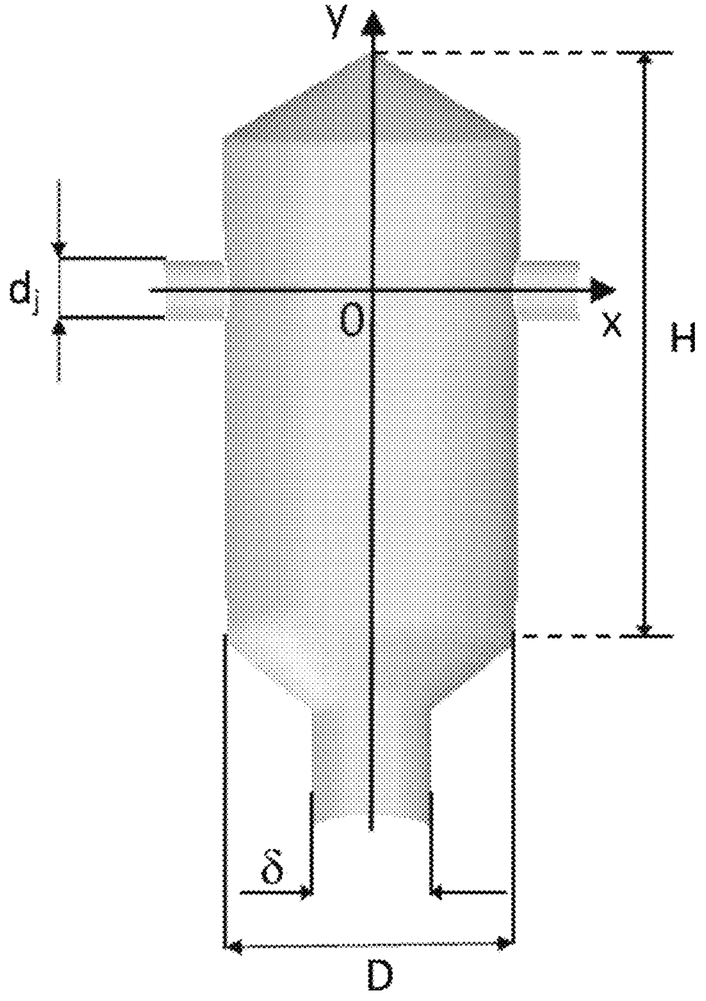
Fig. 1 (Prior Art)
Figure 2:
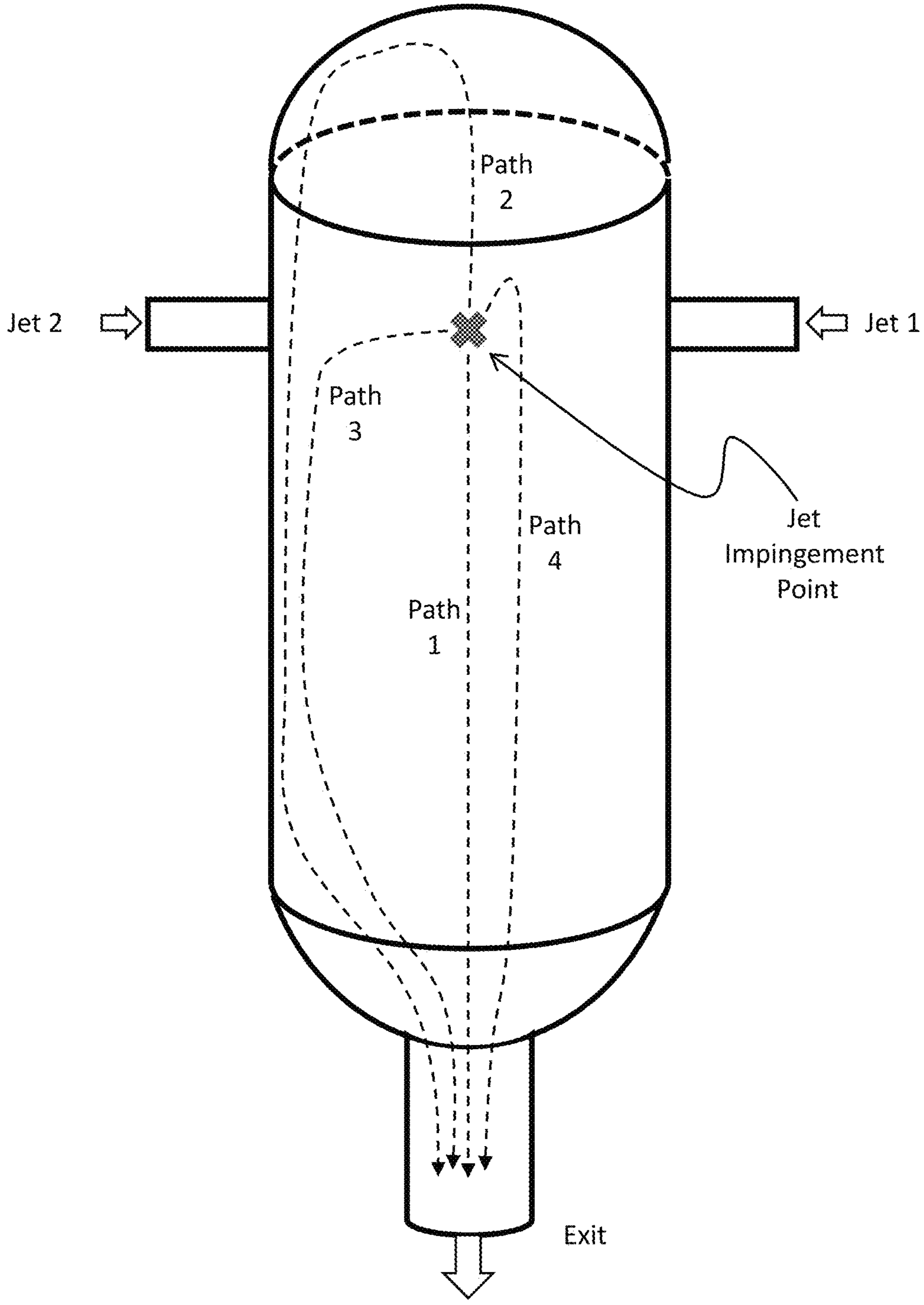
Figure 3A:
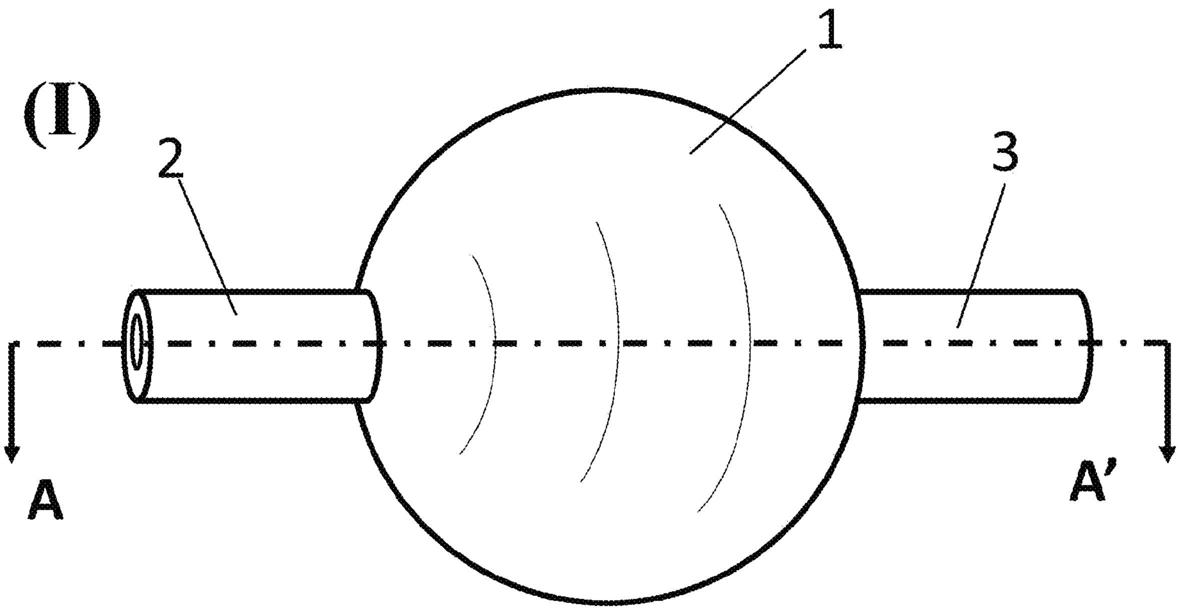
Figure 3B:
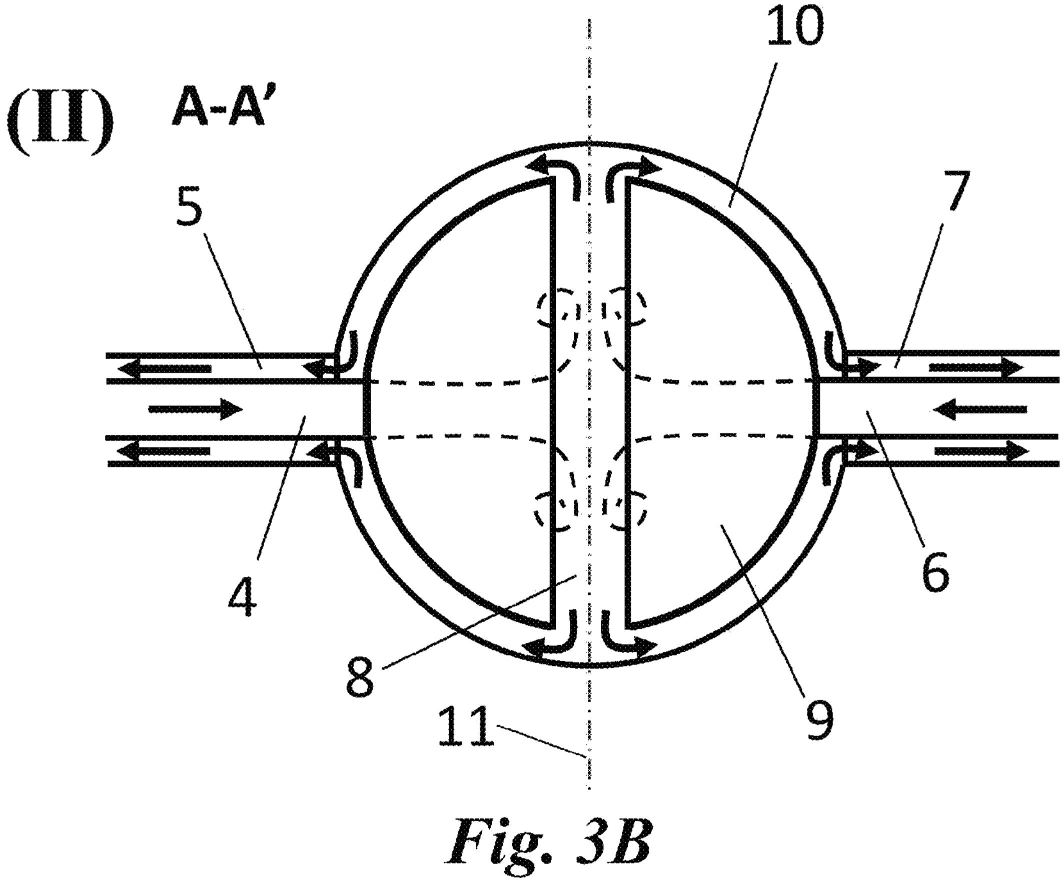
Figure 4A:
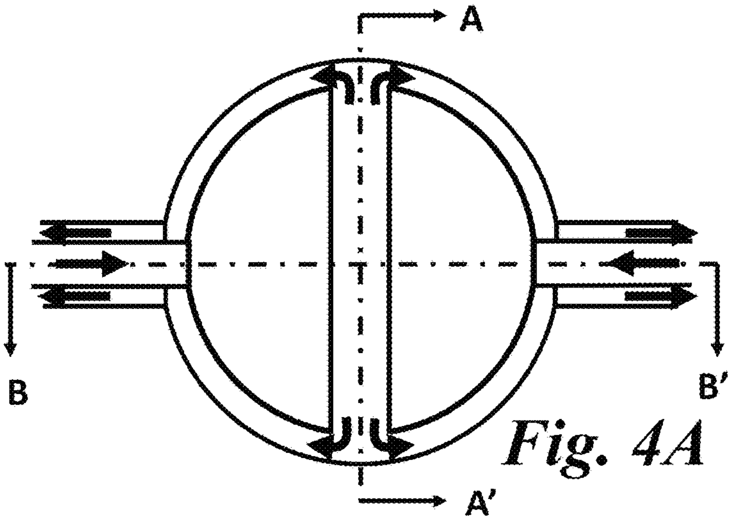
Figure 4B:
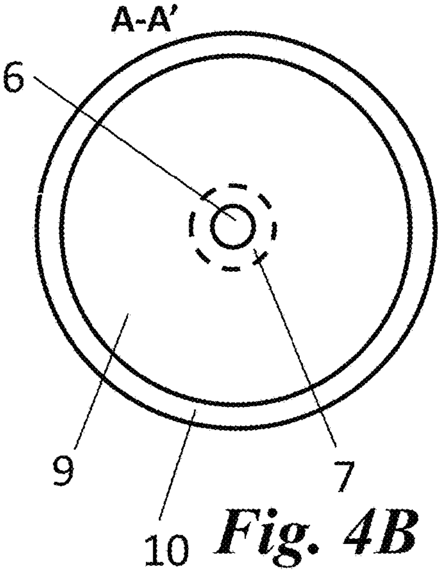
Figure 4C:
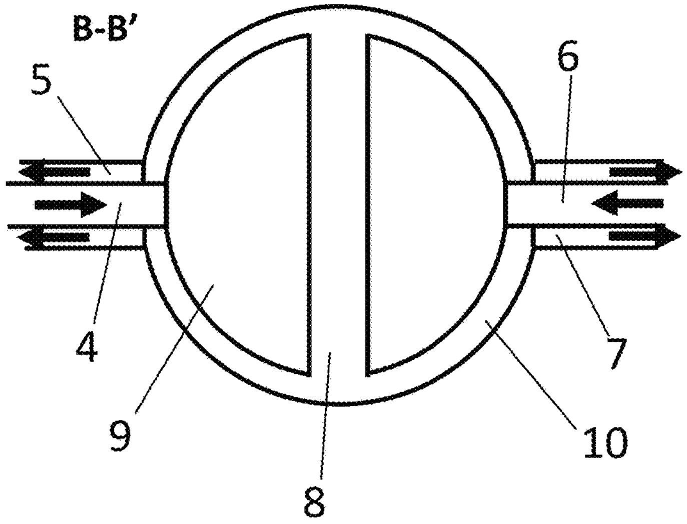
Figure 5A:
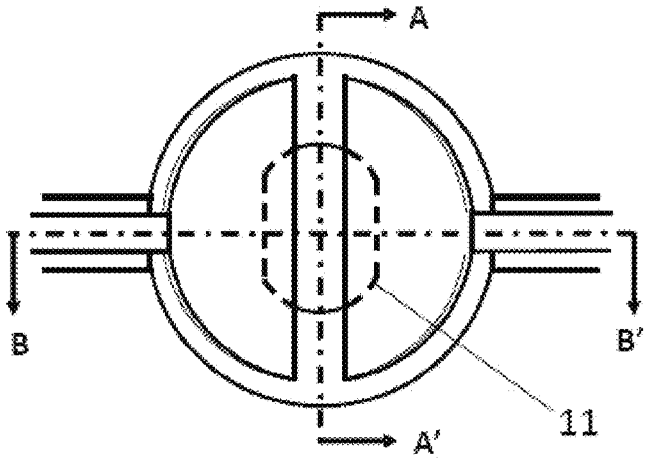
Figure 5B:
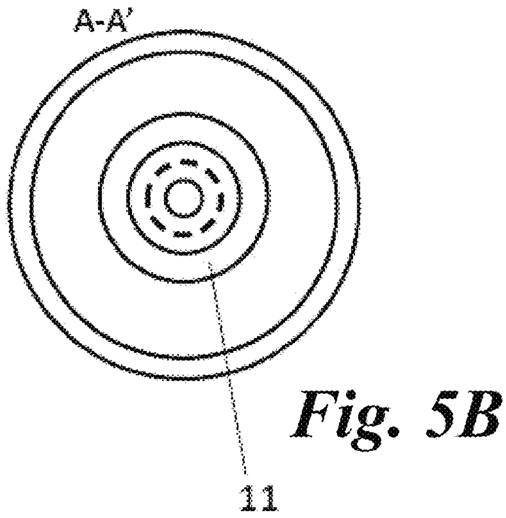
Figure 5C:
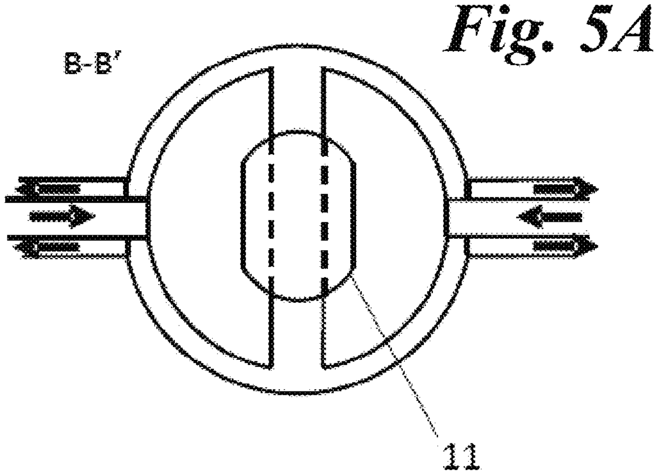
Figure 6A:
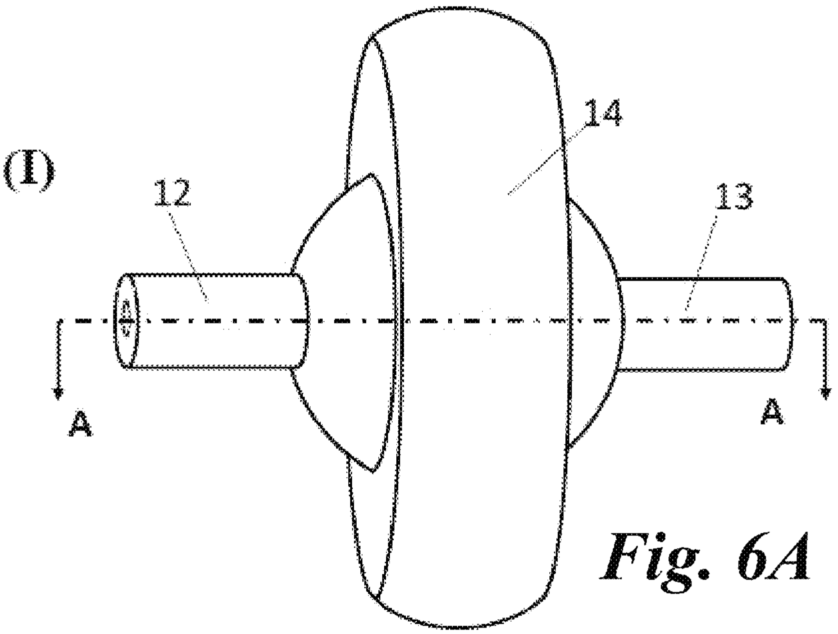
Figure 6B:
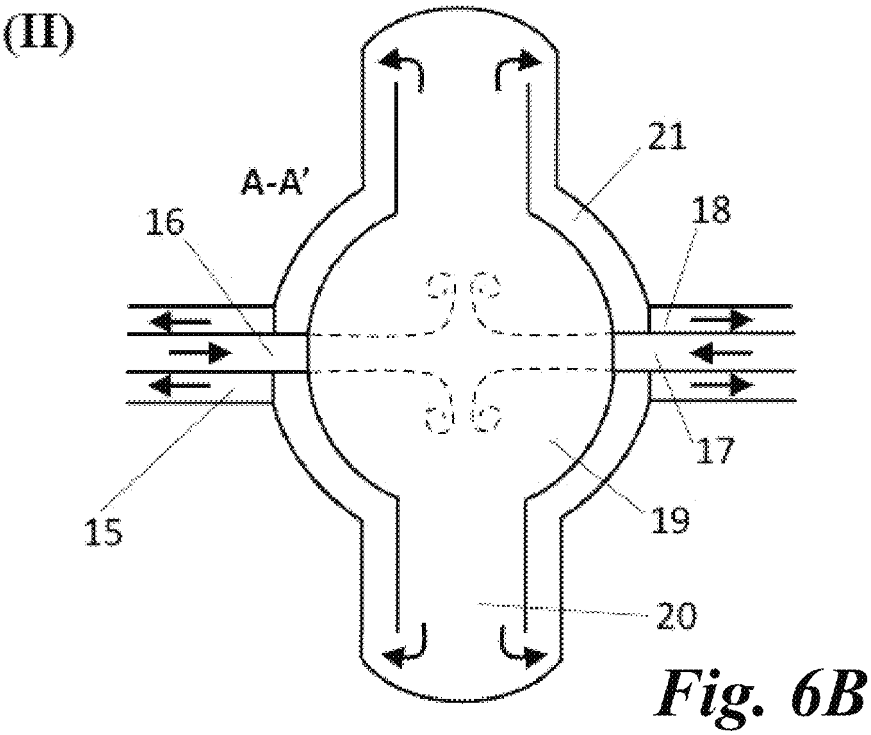
Figure 7A:
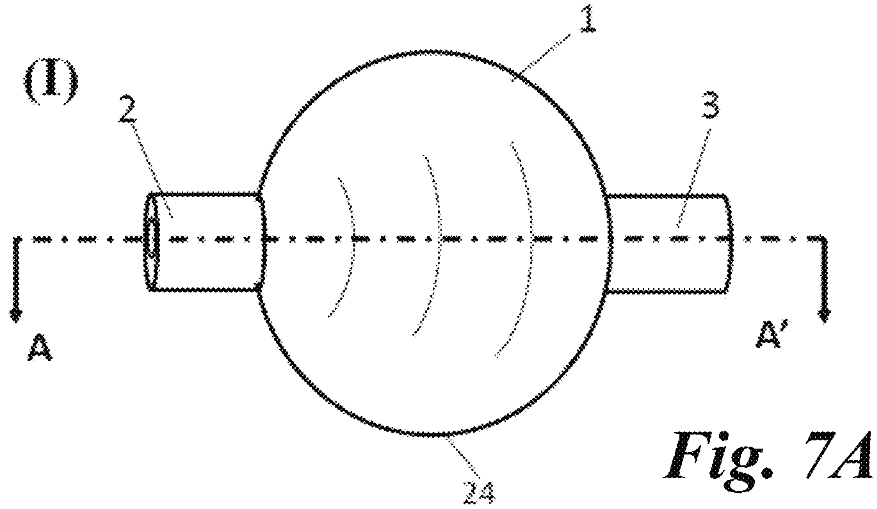
Figure 7B:
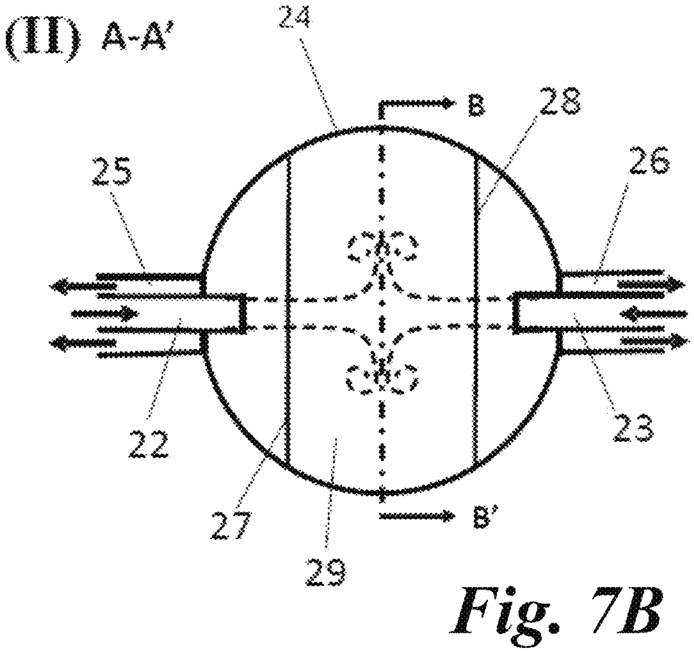
Figure 7C:
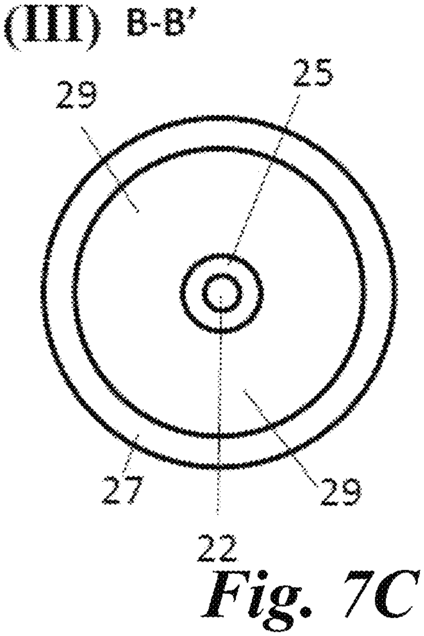
Figure 8A:
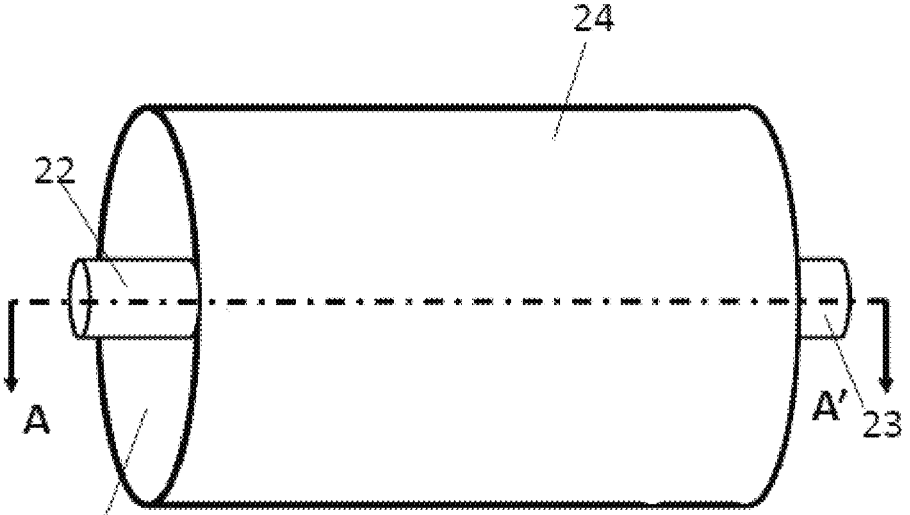
Figure 8B:
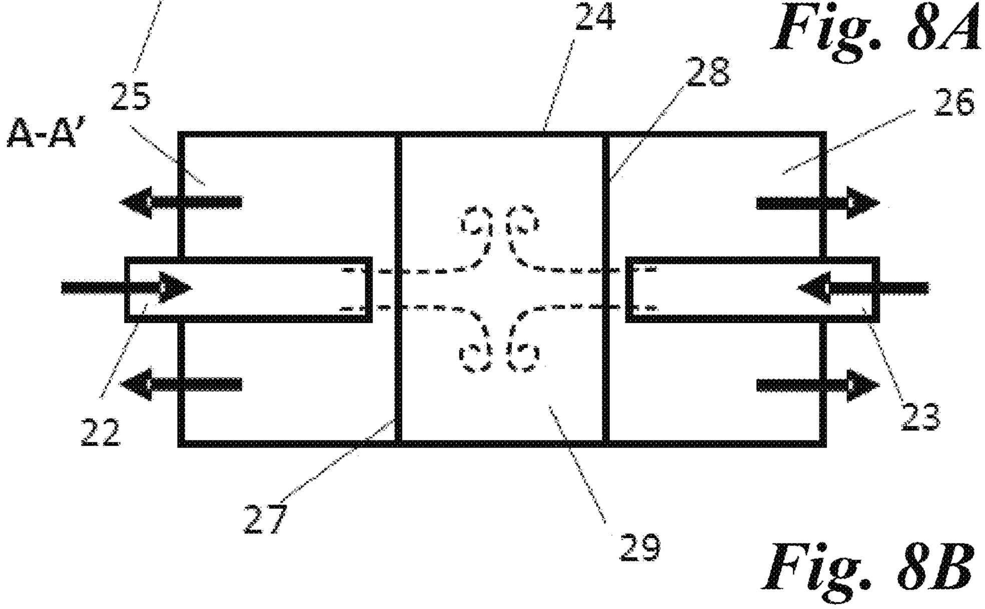
Figure 9A:
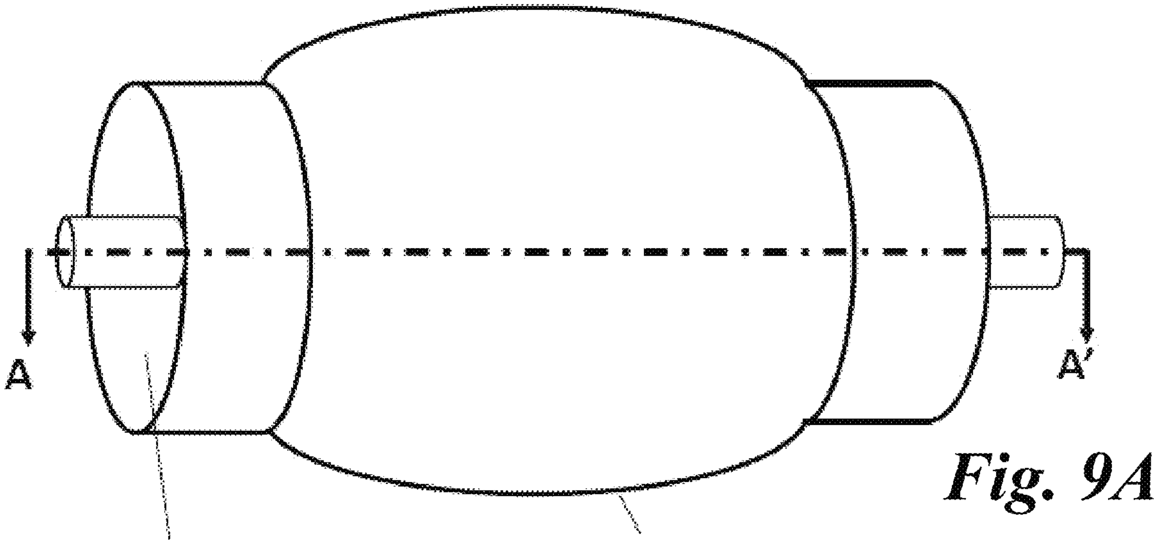
Figure 9B:
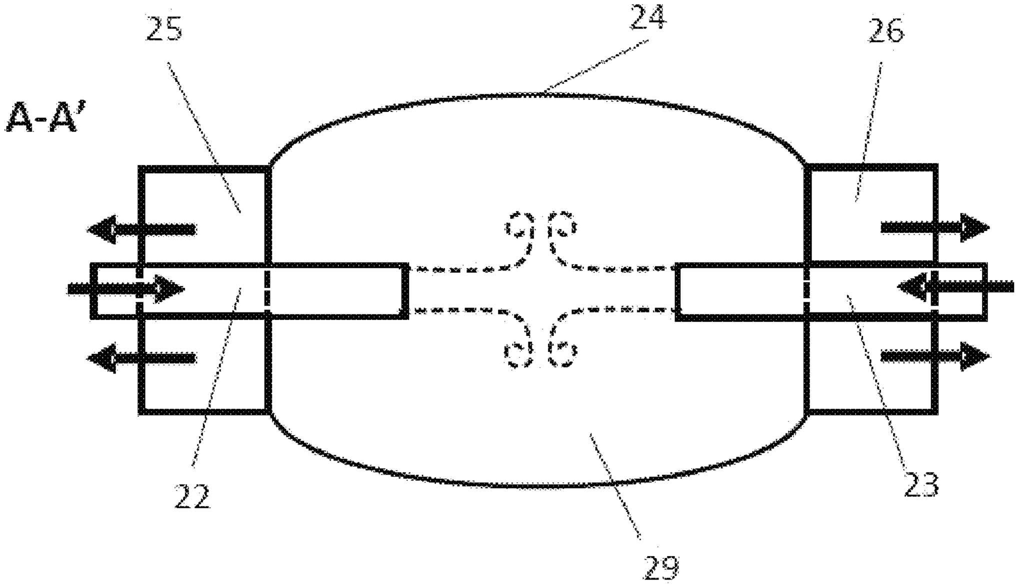
Figure 11A:
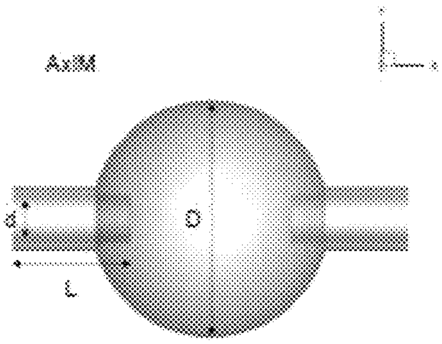
Figure 11B:
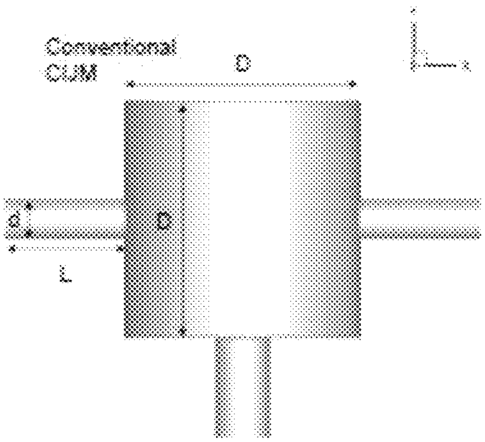

Having thus described the presently disclosed subject matter in general terms, reference will now be made to the accompanying Figures, which are not necessarily drawn to scale, and wherein:

FIG. 1 illustrates an example of a typical cylindrical CIJM used for reaction/polymerization/complexation process (prior art);

FIG. 2 illustrates a schematic of a cylindrical CIJM showing distinct paths with different pathlengths for the products/particles generated by the reaction/polymerization/complexation process (prior art);

FIG. 3A and FIG. 3B illustrate schematics of one embodiment of the axisymmetric confined impinging jet mixer (referred to herein as AxIM). FIG. 3A illustrates a perspective view of the presently disclosed AxIM device and FIG. 3B illustrates a cross-sectional view of the presently disclosed AxIM device;

FIG. 4A, FIG. 4B, and FIG. 4C illustrate other views of the presently disclosed AxIM device shown in FIG. 3A and FIG. 3B;

FIG. 5A, FIG. 5B, and FIG. 5C illustrates a schematic of another embodiment of the presently disclosed AxIM device with an internal baffle that enforces breakdown and mixing in the shear layers resulting from the impinging jet. Multiple cross-sectional views are shown;

FIG. 6A and FIG. 6B illustrate schematic diagrams of another embodiment of the presently disclosed AxIM device having an extended mixing chamber that facilitates a longer residence time;

FIG. 7A, FIG. 7B, and FIG. 7C illustrate schematic diagrams of another embodiment of the presently disclosed AxIM device having a spherical mixing chamber similar to the embodiment of FIG. 3A and FIG. 3B, but with a different outflow arrangement and two internal baffles for promoting mixing;

FIG. 8A and FIG. 8B illustrate schematic diagrams of another embodiment of the presently disclosed AxIM device having an annular cylindrical design comprising two internal baffles for promoting mixing;

FIG. 9A and FIG. 9B illustrate schematic diagrams of another embodiment of the presently disclosed AxIM device similar to the embodiment of FIG. 7A, FIG. 7B, and FIG. 7C, but having a larger mixing chamber;

FIG. 10A, FIG. 10B, FIG. 10C, FIG. 10D illustrate graphical views of data from computational fluid dynamic simulations of flow in a conventional micromixer versus the presently disclosed AxIM device;

FIG. 11A and FIG. 11B illustrate schematic diagrams of configurations used to compare performance of the presently disclosed AxIM device and a conventional cylindrical micromixer;

FIG. 12A, FIG. 12B, FIG. 12C, and FIG. 12D illustrate flow models and graphical views of residence time data from computational fluid dynamic simulations of the presently disclosed AxIM device and a conventional cylindrical micromixer;

FIG. 13A, FIG. 13B, FIG. 13C, and FIG. 13D illustrate flow models and graphical views of residence potential data from computational fluid dynamic simulations of the presently disclosed AxIM device and a conventional cylindrical micromixer; and FIG. 14A, FIG. 14B, FIG. 14C, and FIG. 14D illustrate (FIG. 14A) the presently disclosed AxIM device showing the two halves separated to reveal the configurations of the AxIM chamber (middle); (FIG. 14B) the nanoparticle assembly set-up using the presently disclosed AxIM device connected to syringes attached to a syringe pump; (FIG. 14C) size distribution curves of the two batches of DNA/PEI nanoparticles prepared using the presently disclosed AxIM device and CIJ devices at a DNA concentration of 200 μg/mL and a PEI concentration of 158.8 μg/mL, using a flow rate of 20 mL/min for a single jet (i.e., syringe); (FIG. 14D) the z-average of the particle size produced using the presently disclosed AxIM device or a conventional CIJ, showing a 17.4% reduction in the polydispersity index (PDI) achieved using the presently disclosed AxIM device under the tested conditions.

DETAILED DESCRIPTION

The presently disclosed subject matter now will be described more fully hereinafter. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims.

The presently disclosed subject matter relates to a process and a device for the continuous micromixing of two fluids. Effective continuous micromixing of fluids is desired in the case of certain very rapid reactions, as well as in the case where it is desired to rapidly homogenize two or more miscible or immiscible components. The presently disclosed process and device can be used in particular when micromixing plays an important role, for example, in the yield and characteristics of the products. This is the case for crystallization, precipitation, and combustion reactions and for micelle assembly or polyelectrolyte complexation processes.

Rapid and efficient mixing of two fluids is required to ensure uniform phase separation and reaction when these processes are kinetically limited, i.e., for rapid phase separation as a result of solution jet mixing or for fast chemical reaction enabled by the mixing of the components introduced by the solution jets. It is thus convenient, in certain cases, to mix the reactants at the molecular level (micromixing) in a time shorter than the characteristic reaction time or assembly time.

The presently disclosed subject matter provides an axisymmetric CIJM device that achieves highly uniform pathlengths of the products and results in a more uniform residence time. As used herein, the term "axisymmetric" means symmetrical about an axis. The characteristics of the presently disclosed axisymmetric CIJM device facilitate the generation of products with uniform size and/or composition.

Referring now to FIGS. 3A and 3B, are schematics of one embodiment of the presently disclosed axisymmetric confined impinging jet mixer (referred to herein as AxIM). More particularly, FIG. 3A illustrates a schematic of one embodiment of the axisymmetric confined impinging jet mixer. The AxIM includes a main body 1. Fluid transmission conduits 2 and 3 are connected to main body 1 of the mixer. FIG. 3B illustrates a cross-sectional view of the AxIM shown in FIG. 3A, along axis A-A'.

Fluid transmission conduits 2 and 3 include inlet tubes 4 and 6 and outlet tubes 5 and 7. The inlet tubes 4 and 6 are for the two fluid streams that are to be mixed to enter the main body of mixer 1. Corresponding outlet tubes 5 and 7 are arranged in an annular arrangement to inlet tubes 4 and 6. A central mixing chamber 8 includes an axisymmetric slit 11 and a spherical shaped wall 9 of mixing chamber 8. A spherical collection passage 10 collects the products from the slit and delivers them to the outlet tubes 5 and 7. The entire assembly is axisymmetric with respect to the impinging jets. The thick arrows in the figure depict the direction of the flow. The two impinging jets in the mixer are shown with dashed lines. All major elements of the device including the fluid transmission conduits 2 and 3, the mixing chamber 1, as well as the collection passage 10, are axisymmetric. Thus, the presently disclosed AxIM device achieves complete axisymmetry with respect to the two impinging jets. Loss of asymmetry in any of these elements is detrimental to the uniformity of the residence time. The presently disclosed AxIM device can be formed from any number of materials known to or conceivable to one of skill in the art that are non-reactive with the chemicals inside the chamber.

FIGS. 4A-4C illustrate other views of the AxIM embodiment shown in FIGS. 3A and 3B. FIG. 4A illustrates a top down, partially sectional view of the AxIM. FIG. 4B is a sectional view of FIG. 4A, along axis A-A' and FIG. 4C is a sectional view of FIG. 4A along axis B-B'. As described with respect to FIGS. 3A and 3B, fluid transmission conduits 2 and 3 include inlet tubes 4 and 6 and outlet tubes 5 and 7. The inlet tubes 4 and 6 are for the two fluid streams that are to be mixed to enter the central mixing chamber 8. The spherical collection passage 10 within the wall 9 of the mixing chamber 8 collects the products from the slit and delivers them to the outlet tubes 5 and 7.

FIGS. 5A-5C illustrates sectional views of a schematic of another embodiment of the presently disclosed AxIM device. The embodiment illustrated in FIGS. 5A-5C includes an axisymmetric internal baffle 11 that enforces breakdown and mixing in the shear layers resulting from the impinging jet. More particularly, axisymmetric baffle 11 facilitates the breakdown of the circular shear layer resulting from the jet impingement and promotes mixing.

FIGS. 6A and 6B illustrate schematic diagrams of another embodiment of the presently disclosed AxIM device having an extended mixing chamber that facilitates a longer residence time. FIG. 6A illustrates a schematic of another embodiment of the axisymmetric confined impinging jet mixer. Fluid transmission conduits 12 and 13 are connected to a main body of the mixer 14. FIG. 6B illustrates a cross-sectional view of the AxIM embodiment shown in FIG. 6A taken along axis A-A'. Fluid transmission conduits 12 and 13 include inlet tubes 16 and 17 for the two fluid streams that are to be mixed. Corresponding outlet tubes 15 and 18 are arranged in an annular arrangement to the inlet tubes 16 and 17. A central mixing chamber 19 is axisymmetric. An axisymmetric chamber extension 20 allows a longer residence time for the reaction/complexation process to occur. A collection passage 21 collects the products from the mixing chamber and delivers them to the outlet tubes 15 and 18. The entire assembly is axisymmetric with respect to the impinging jets. The thick arrows in the figure depict the direction of the flow.

FIGS. 7A-7C illustrate schematic diagrams of another embodiment of the presently disclosed AxIM device having a spherical mixing chamber similar to the embodiment of FIGS. 3A and 3B, but with a different outflow arrangement and two internal baffles for promoting mixing. FIG. 7A illustrates a schematic diagram, while FIGS. 7B and 7C illustrate sectional views of FIG. 7A taken along axes A-A' and B-B', respectively. Fluid transmission conduits 2 and 3 are connected to the main body 1 of the mixer. Fluid transmission conduits 2 and 3 further include inlet tubes 22 and 23 and outlet tubes 25 and 26. A mixing chamber 29 includes with wall 24. Axisymmetric baffles 27 and 28 promote mixing.

FIGS. 8A and 8B illustrate schematic diagrams of another embodiment of the presently disclosed AxIM device having an annular cylindrical design and two internal baffles for promoting mixing. FIG. 8A illustrates a schematic diagram of the AxIM and FIG. 8B illustrates a sectional view of FIG. 8A taken along axis A-A'. Inlet tubes 22 and 23 direct fluid flow into the mixing chamber 29 and outlet tubes 25 and 26 allow for fluid flow out of the mixing chamber. Walls 24 connect the outlet tubes 25 and 26 to the mixing chamber 29. Baffles 27 and 28 promote mixing and are axisymmetric.

FIGS. 9A and 9B illustrate schematic diagrams of another embodiment of the presently disclosed AxIM device similar to the embodiment of FIGS. 7A-7C, but with a larger mixing chamber. FIG. 9A illustrates a schematic diagram of the AxIM and FIG. 9B illustrates a sectional view of FIG. 8A taken along axis A-A'. Inlet tubes 22 and 23 direct fluid flow into the mixing chamber 29 and outlet tubes 25 and 26 allow for fluid flow out of the mixing chamber. Walls 24 connect the outlet tubes 25 and 26 to the mixing chamber 29. Baffles 27 and 28 promote mixing and are axisymmetric.

Accordingly, in some embodiments, the presently disclosed subject matter provides a device for mixing, the device comprising: an axisymmetric mixing chamber having an axis of symmetry; and a pair of fluid transmission conduits, the fluid transmission conduits comprising: a pair of inlet tubes wherein the inlet tubes are aligned along the axis of symmetry, wherein the pair of inlet tubes facilitate flow of two fluids to be mixed; and outlet tubes to facilitate flow of a resultant fluid mixture out of the axisymmetric mixing chamber.

In some embodiments, the outlet tubes are aligned along the axis of symmetry. In some embodiments, the outlet tubes are arranged in an annular arrangement in relation to the pair of inlet tubes.

In some embodiments, the axisymmetric mixing chamber further comprises an axisymmetric slit.

In some embodiments, the axisymmetric mixing chamber further comprises a spherical shaped wall. In some embodiments, the spherical shaped wall comprises a collection passage to collect the resultant fluid mixture to deliver the resultant fluid mixture to the outlet tubes.

In some embodiments, the axisymmetric mixing chamber further comprises a cylindrical shaped wall. In some embodiments, the cylindrical shaped wall comprises a collection passage to collect the resultant fluid mixture to deliver the resultant fluid mixture to the outlet tubes.

In some embodiments, the device further comprises axisymmetric internal baffles positioned within the axisymmetric mixing chamber.

In some embodiments, the device further comprises an axisymmetric chamber extension to allow for a longer residence time for the reaction/complexation process to occur.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of ordinary skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Representative Data

Figure 10A:
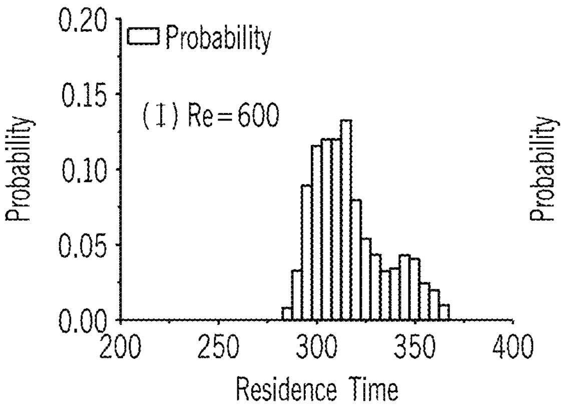
Figure 10B:
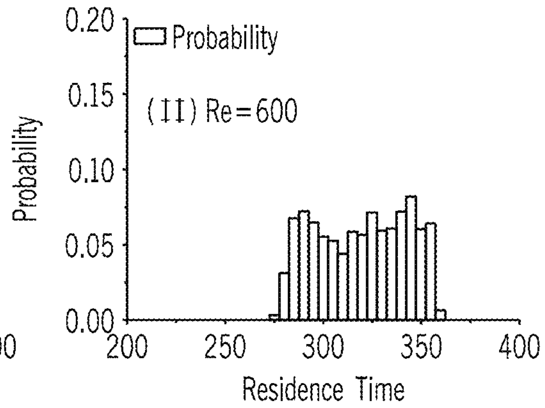
Figure 10C:
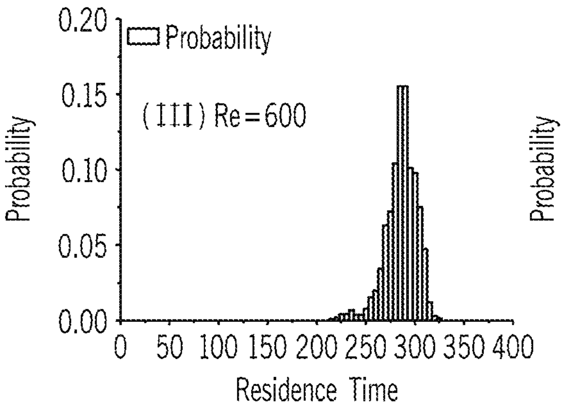
Figure 10D:
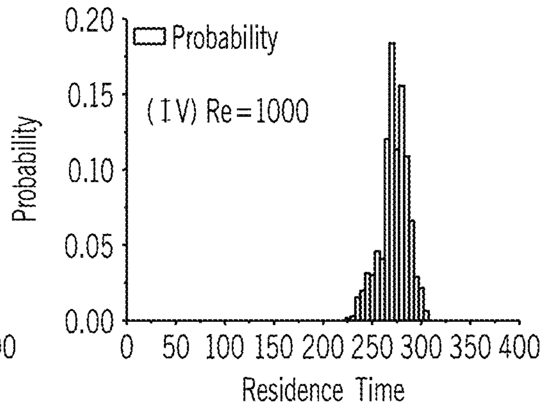

Referring now to FIGS. 10A-10D, are graphical views of data from computational fluid dynamic simulations of flow in a conventional micromixer versus AxIM. FIGS. 10A and 10B illustrate results from simulations of a non-axisymmetric, cylindrical mixer. Plots show the probability density function (PDF) of residence time of flow inside the mixer for a Reynolds number (Re) or 600 and 1000. A narrow PDF represents a more uniform residence time and vice-versa. FIGS. 10C and 10D illustrate results from simulations of an axisymmetric mixer (AxIM). Plots show the probability density function (PDF) of residence time of flow inside the mixer for a Reynolds number (Re) or 600 and 1000. The PDFs for this mixer are clearly narrower compared to the non-axisymmetric device shown in FIGS. 7A and 7B and demonstrate that the axisymmetric design results in more uniform residence time. Table 1 provides quantitative information about the standard deviation of the two sets of PDFs.

Referring now to Table 1 is a comparison of the standard deviation of residence times for non-axisymmetric (cylindrical) and axisymmetric (AxIM) mixers obtained from computational fluid dynamics modeling. Standard deviation quantifies the narrowness of a probability density function. In this case, a lower standard deviation denotes more uniform residence time. At a Reynolds number of 1000, the standard deviation in the residence time of the presently disclosed AxIM device is nearly half that of the conventional, non-axisymmetric mixer.

TABLE 1

| Type of Mixer | Re = 600 | Re = 1000 |
|---|---|---|
| Cylindrical, non-axisymmetric | 18.8 | 23.28 |
| Axisymmetric (AxIM) | 16.2 | 14.4 |

Due to the improved uniformity of the resident time in the presently disclosed AxIM device, uniform nanoparticles can be produced at lower jet flow rates or in a smaller device volume, which reduces the cost of the device.

FIGS. 11A and 11B illustrate schematic diagrams of configurations used to compare performance of AxIM and a conventional cylindrical micromixer FIG. 11A illustrates a schematic diagram of one embodiment of an AxIM used in computational fluid dynamic models. FIG. 11B Schematic of a conventional cylindrical CIJM of dimensions comparable to the AxIM used in computational fluid dynamic models. The Reynolds number for these mixer simulations is 500. The simulations estimate the reaction potential by the following equations.

Single Stage, Second-Order Kinetics Reaction $$C_1 + C_2 \xrightarrow{k} C_3$$

$$\frac{DC_3}{Dt} = kC_1C_2$$

Define Reaction Potential

Combination of Mixing and Residence Time $$\frac{D\phi}{Dt} = C_1C_2,$$

$$\frac{DC_3}{Dt} = k\frac{D\phi}{Dt},$$

$$C_3 = k\phi$$

Assuming the product size is proportional to the product concentration, we can estimate the product uniformity based on the reaction potential uniformity.

Figure 12A:
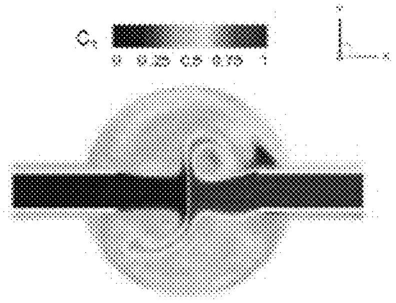
Figure 12B:
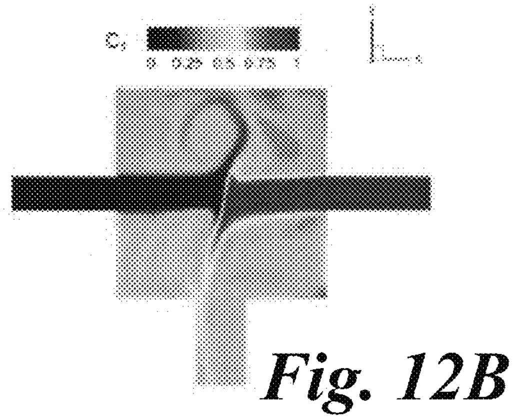
Figure 12C:
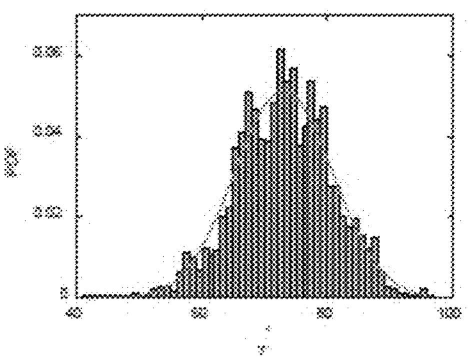
Figure 12D:
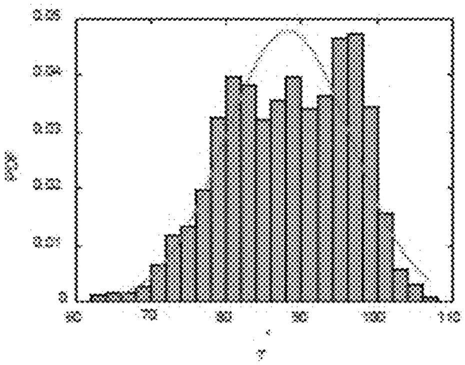

FIGS. 12A-12D illustrate flow models and graphical views of residence time data from computational fluid dynamic simulations of AxIM and a conventional cylindrical micromixer. FIGS. 12A and 12B illustrate contour plots of scalar concentrations from simulations of AxIM and the comparable conventional CIJM shown in FIG. 11B. FIGS. 12C and 12D show the probability density function (PDF) of residence time of flow exiting the mixers. The computed excess Kurtosis for AxIM is 17% above a normal distribution (which has a value of 3.0) whereas that of the conventional CIJM is 20% below that of a normal distribution. This indicates that the AxIM residence time has a significantly "heavier tail" as compared to conventional CIJM, which suggests a more uniform residence time for AxIM.

Figure 13A:
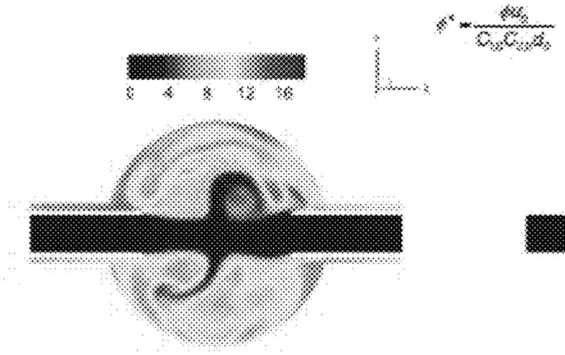
Figure 13B:
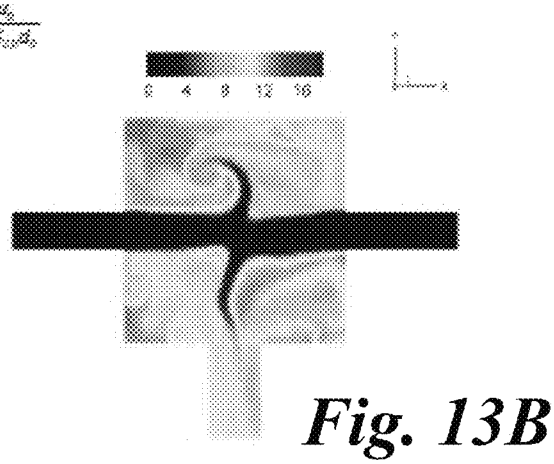
Figure 13C:
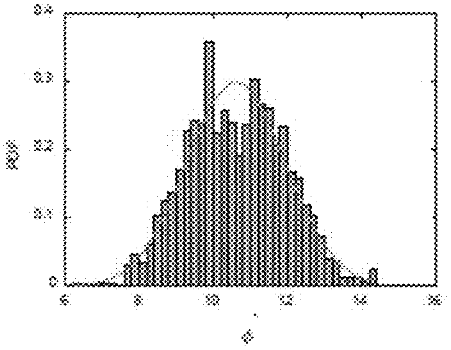
Figure 13D:
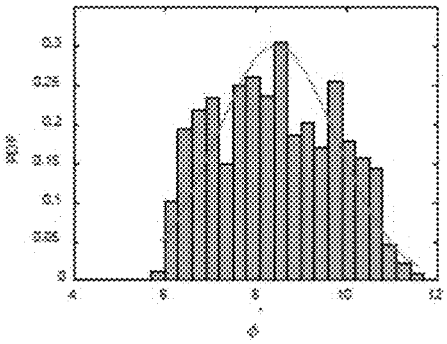

FIGS. 13A-13D illustrate flow models and graphical views of reaction potential data from computational fluid dynamic simulations of AxIM and a conventional cylindrical micromixer. FIGS. 13A and 13B illustrate contour plots of reaction potential from simulations of AxIM and the comparable conventional CIJM shown in FIG. 11B. FIGS. 13C and 13D show the probability density function (PDF) distribution of the reaction potential of flow exiting the mixers. The computed excess Kurtosis for AxIM is 10% below a normal distribution whereas that of the conventional CIJM is 33% below that of a normal distribution. This indicates that the AxIM will generate a more uniform product than a conventional CIJM with a similar size and operational parameters.

Example 2

Comparative Example Improve Uniformity of Prepared FNC-Assembled Nanoparticles Using Axim Device Over Conventional CIJ Device 2.1 Materials and Methods Plasmid DNA (4.4 kb) was dissolved in ultrapure water at a concentration of 400 μg/mL; PEI (in vivo-jetPEI concentrated solution from Polyplus, Inc.) was diluted by ultrapure water to a final concentration of 317.6 μg/mL to achieve an N/P ratio (a molar ratio of nitrogen in PEI to phosphate in DNA) of six. The two solutions were loaded into two separate syringes driven by a syringe pump; and the syringes were connected to an AxIM device or a conventional CIJ device. The solutions were injected into the AxIM or CIJ device at a flow rate of 20 mL/min for each syringe. The first 1 mL of flow-through solution was discarded. The rest of flow-through solution was collected under the steady flow rate. The obtained nanoparticle suspension has a final DNA concentration of 200 μg/mL and a PEI concentration of 158.8 μg/mL. Size distribution of the assembled nanoparticles was assessed by dynamic light scattering measurements.

2.2 Results and Discussion

Figure 14A:
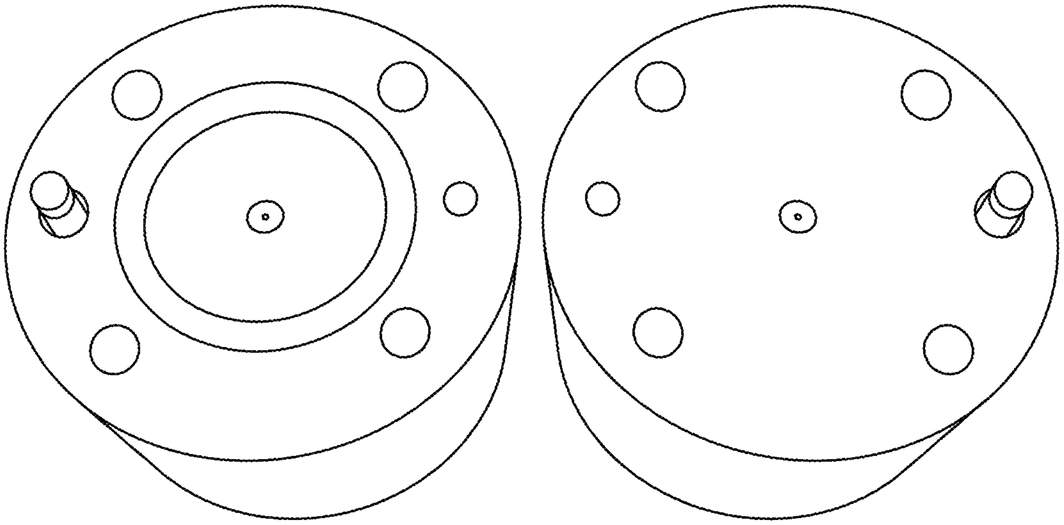
Figure 14B:
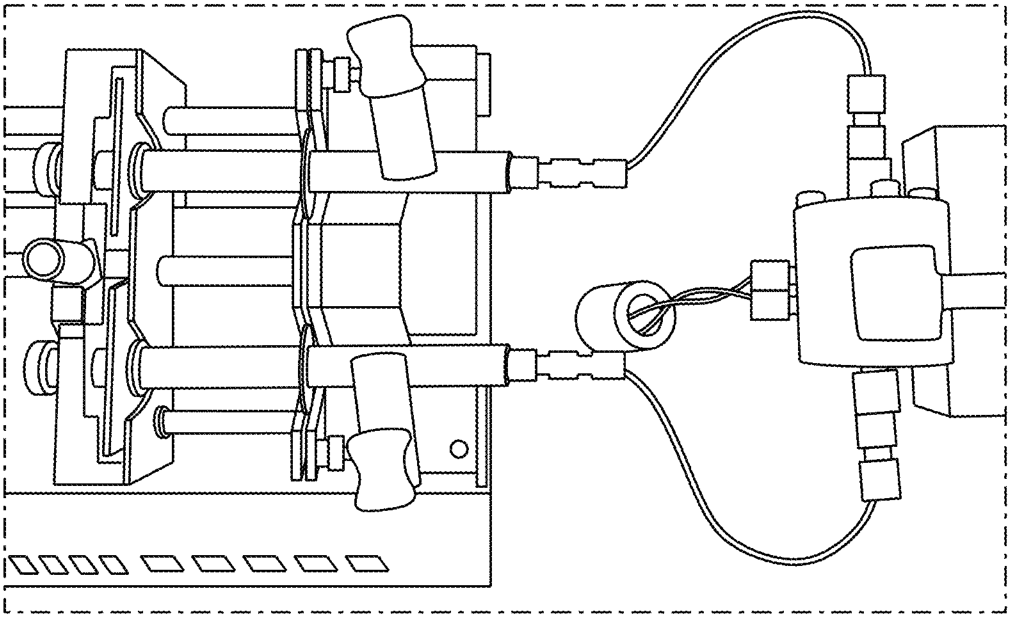
Figure 14C:
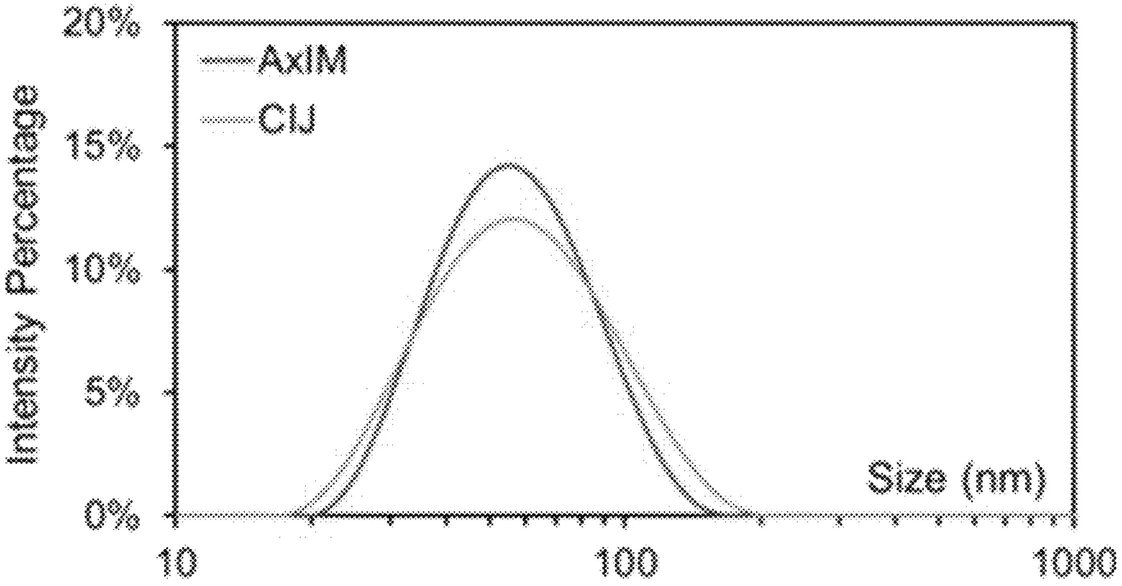

A finished AxIM device is shown in FIG. 14A. The two halves of the mixing chamber/block were assembled together with four bolts and sealed by an O-ring to prevent leakage. The axes of the inlets and outlets are perpendicular to the midplane of the mixing chamber. The inlets of the device were connected to the syringes using the tubing/connector sets in the similar manner to that for the CIJ device (FIG. 14B). The same flow rate of 20 mL/min (for a single syringe) was used for both the AxIM and conventional CIJ device setups. The DNA/PEI nanoparticles generated by the AxIM and CIJ devices had z-average diameters of 51.5±0.7 nm, and 51.8±0.2 nm, respectively (FIG. 14C and FIG. 14D). There was a 17.4% reduction of the polydispersity index (PDI) for the nanoparticles generated by AxIM (0.142±0.009) compared with that of the nanoparticles generated by conventional CIJ (0.172±0.009). These results indicate a higher degree of uniformity of the nanoparticles generated by the AxIM device compared with that by the conventional CIJ device. Without wishing to be bound to any one particular theory, it is thought that a higher mixing efficiency achieved by the AxIM device affords a more uniform mixing of the two components, e.g., DNA and PEI molecules, introduced by the two inlet jets, thus resulting in an improved uniformity in assembling polyelectrolyte complex nanoparticles.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A device for mixing comprising:

an axisymmetric mixing chamber having an axis of symmetry; and a pair of fluid transmission conduits, the fluid transmission conduits comprising:

a pair of inlet tubes wherein the inlet tubes are aligned along the axis of symmetry, wherein the pair of inlet tubes facilitate flow of two fluids to be mixed; and outlet tubes to facilitate flow of a resultant fluid mixture out of the axisymmetric mixing chamber, wherein the outlet tubes are aligned along the axis of symmetry and are arranged in an annular arrangement in relation to the pair of inlet tubes;

wherein the axisymmetric mixing chamber comprises a spherical shaped wall comprising a collection passage within the spherical shaped wall of the axisymmetric mixing chamber to collect the resultant fluid mixture to deliver the resultant fluid mixture to the outlet tubes.

2. The device of claim 1, wherein the axisymmetric mixing chamber further comprises an axisymmetric slit.

3. The device of claim 1, further comprising axisymmetric internal baffles positioned within the axisymmetric mixing chamber.

4. The device of claim 1, further comprising an axisymmetric chamber extension to allow for a longer residence time for a reaction/complexation process to occur.

* * * * *